(12) United States Patent
Speckbacher et al.

(10) Patent No.: US 7,488,353 B2
(45) Date of Patent: Feb. 10, 2009

(54) CATIONIC HETEROARYLAZINE DYES AND COLORANTS CONTAINING THESE COMPOUNDS

(75) Inventors: Markus Speckbacher, Mschaffenburg (DE); Hans-Juergen Braun, Ueberstorf (CH)

(73) Assignee: Wella AG, Darmstadt (DE)

( * ) Notice: Subject to any disclaimer, the term of this patent is extended or adjusted under 35 U.S.C. 154(b) by 237 days.

(21) Appl. No.: 10/590,858

(22) PCT Filed: Dec. 2, 2004

(86) PCT No.: PCT/EP2004/013705

§ 371 (c)(1), (2), (4) Date: Aug. 25, 2006

(87) PCT Pub. No.: WO2005/083009

PCT Pub. Date: Sep. 9, 2005

(65) Prior Publication Data

US 2007/0174975 A1   Aug. 2, 2007

(30) Foreign Application Priority Data

Feb. 28, 2004  (DE) .................. 10 2004 009 782

(51) Int. Cl.
  *A61Q 5/10* (2006.01)
  *C07C 241/00* (2006.01)
(52) U.S. Cl. .............. 8/405; 8/406; 8/409; 8/435; 8/568; 8/570; 8/571; 8/575; 564/249
(58) Field of Classification Search .............. 8/405, 8/406, 409, 435, 568, 570, 571, 575; 564/249
See application file for complete search history.

(56) References Cited

FOREIGN PATENT DOCUMENTS

| EP | 1 234 569 | | 8/2002 |
|---|---|---|---|
| GB | 808 308 | | 2/1959 |
| GB | 808308 | * | 2/1959 |
| GB | 885 520 | | 12/1961 |
| GB | 885-521 | * | 12/1961 |
| GB | 885 521 | | 12/1961 |
| WO | 03/060015 | | 7/2003 |

OTHER PUBLICATIONS

STIC Search Report dated Mar. 14, 2008.*
Siegfried Huenig et al: "Violene/Cyanine Hybrids . . . " Chem. Eur. J. 2000, 6, No. 14, pp. 2618-2632 (In English).

* cited by examiner

*Primary Examiner*—Eisa B Elhilo
(74) *Attorney, Agent, or Firm*—Michael J. Striker

(57) ABSTRACT

Cationic heteroarylazine dyes of general formulas (I) and (II)

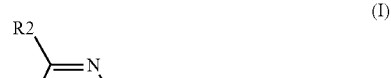

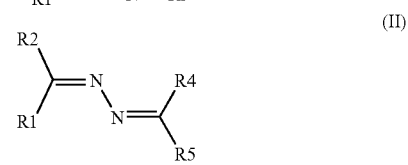

and colorants for keratin fibers containing these compounds.

10 Claims, No Drawings

CATIONIC HETEROARYLAZINE DYES AND COLORANTS CONTAINING THESE COMPOUNDS

CROSS REFERENCE TO RELATED APPLICATIONS

This application claims priority under 35 U.S.C. 119(a)-(d) to German Patent Application DE 102004009782.8, filed Feb. 28, 2004.

BACKGROUND OF THE INVENTION

1. Field of the Invention

The present invention has for an object novel cationic heteroarylazine dyes and colorants containing these compounds, for dyeing keratin fibers, for example hair, wool or furs.

2. Description of Related Art

In general, keratin fibers are dyed either with oxidation dyes formed by the coupling of one or more developer components with one or more coupler components, or with direct dyes.

If necessary, oxidation-resistant direct dyes may be added to the oxidative system to achieve special color effects. Direct dyes are incorporated into appropriate carrier compositions and then applied to the fibers. This method, generally known as tinting, is simple to apply, quite gentle and characterized by causing only very minor damage to the keratin fibers, because no ammonia or peroxide is added. The dyes used for this purpose, however, must meet certain requirements. They must be unobjectionable from a toxicological and dermatological standpoint and they must produce colorations of the desired intensity and brilliance. Moreover, the colorations obtained must show high light stability and resistance to shampooing as well as high abrasion resistance.

For a direct, non-oxidative colorant for keratin fibers, a combination of different non-oxidative dyes is usually needed to achieve certain color shades. Because the availability of such dyes that meet the said requirements to a sufficient degree is limited, a great need for such dyes continues to exist.

The purpose of the present invention is therefore to provide direct dyes for the coloring of keratin fibers, particularly hair, that meet said requirements.

BRIEF SUMMARY OF THE INVENTION

Surprisingly, we have now found that cationic heteroarylazine dyes of general formulas (I) and (II) can be used as direct dyes in dye compositions and applied to keratin fibers without the addition of an oxidant thus acting very gently.

Because these dyes are resistant to oxidants, however, they can also be used in brightening colorants containing an oxidant, for example a peroxide or a persulfate.

DETAILED DESCRIPTION OF THE INVENTION

The present invention therefore has for an object cationic heteroarylazine dyes of general formulas (I) and (II)

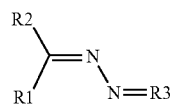
(I)

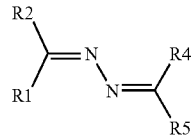
(II)

wherein

R1 stands for a group of formula (III), (IV), (V) or (VI);

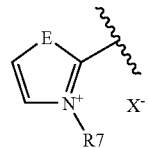
(III)

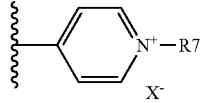
(IV)

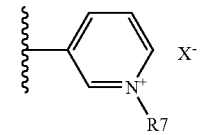
(V)

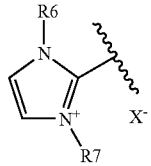
(VI)

E stands for an oxygen atom or a sulfur atom;

R2, R4 and R5 can be equal or different and stand for hydrogen, a tert.butyl group, an isopropyl group, a $C_1$-$C_6$-alkyl group, a $C_1$-$C_6$-hydroxyalkyl group or a group of general formula (VII);

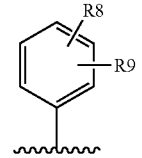
(VII)

R3 stands for a group of formula (VIII), (IX) or (X)

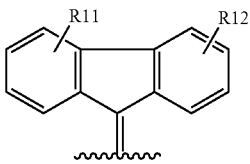
(VIII)

-continued

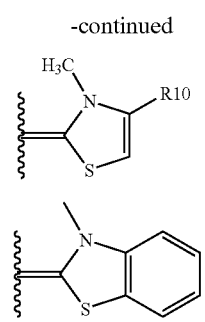

(IX)

(X)

R6 stands for hydrogen, a straight-chain or branched $C_1$-$C_6$-alkyl group or a straight-chain or branched $C_2$-$C_4$-hydroxyalkyl group;

R7 stands for a branched or linear $C_1$-$C_6$-alkyl group, a $C_2$-$C_4$-hydroxyalkyl group or a $C_4$-$C_6$-polyhydroxyalkyl group;

R8 and R9 can be equal or different and stand for hydrogen, a $C_1$-$C_6$-alkylamino group, a $C_1$-$C_6$-N,N-dialkylamino group, a $C_1$-$C_6$-N,N-dihydroxyalkylamino group, a $C_1$-$C_6$-N-hydro-xyalkyl-N-alkylamino group, a $C_1$-$C_6$-alkylcyano group, a methoxymethyl group, a tert.butyl group, an isopropyl group, a $C_1$-$C_6$-alkyl group, a $C_1$-$C_6$-alkyloxy group or a $C_1$-$C_6$-hydro-xyalkyl group;

R10 stands for hydrogen, a straight-chain or branched $C_1$-$C_6$-alkyl group or a straight-chain or branched $C_2$-$C_4$-hydroxyalkyl group;

R11 and R12 can be equal or different and stand for hydrogen, a $C_1$-$C_6$-alkylamino group, a $C_1$-$C_6$-N,N-dialkylamino group, a $C_1$-$C_6$-N,N-dihydroxyalkylamino group, a $C_1$-$C_6$-N-hydroxyalkyl-N-alkylamino group, a $C_1$-$C_6$-alkylcyano group, a methoxymethyl group, a tert.butyl group, an isopropyl group, a $C_1$-$C_6$-alkyl group, a $C_1$-$C_6$-alkyloxy group or a $C_1$-$C_6$-hydroxyalkyl group; and $X^-$ denotes an anion, preferably a sulfate anion, phosphate anion, hydrogen phosphate anion, oxalate anion, formate anion, acetate anion, citrate anion, tartrate anion, malonate anion, pyruvate anion, iodide anion, chloride anion, bromide anion or methylsulfate anion, the chloride anion, bromide anion and methylsulfate anion being particularly preferred.

Suitable cationic heteroarylazine dyes of general formulas (I) and (II) are, for example, the following compounds:
4{(E)-({Bis[4-(dimethylamino)phenyl]methylene}hydrazono)[4-(dimethylamino)phenyl]-methyl}-1-methylpyridinium methylsulfate, 1-(2-hydroxyethyl)-3{(Z)-[(2E)-2-(3-methyl-1,3-benzothiazol-2(3H)-ylidene)hydrazono]methyl}pyridinium bromide, 4{(E)-[(2Z)-(3,4-dimethyl-1,3-thiazol-2(3H)-ylidene) hydrazono]methyl}1-(2-hydroxyethyl)pyridinium bromide, 2-{(E)-[(2Z)-2-(3,4-dimethyl-1,3-thiazol-2 (3H)-ylidene)hydrazono]methyl})3-(methyl)-1-methyl-1H-imidazol-3-ium methylsulfate, 3-(2-hydroxyethyl)-1-methyl-2{-(Z)-[(2E)-2-(3-methyl-1,3-benzothiazol-2-(3H)-ylidene)hydrazono]methyl}1H-imidazol-3-ium bromide, 1-(2-hydroxyethyl)-4{(Z)-[(2E)-2-(3-methyl-1,3-benzothiazol-2(3H)-ylidene)hydrazono]methyl}-pyridinium bromide, 3-(methyl)-1-methyl{(Z)-[(2E)-2-(3-methyl-1,3-benzothiazol-2(3H))-ylidene)hydrazono]methyl}-1H-imidazol-3-ium methylsulfate, 3-{(Z)-(3,4-dimethoxyphenyl)-[(2E)-2-(3-methyl-1,3-benzothiazol-2 (3H)-ylidene)hydrazono]methyl}1-(2-hydroxyethyl) pyridinium bromide, 3{(Z)-[4-(dimethylamino)phenyl] [(2E)-2-(4-methoxybenzylidene)hydrazono]methyl}-1-methylpyridinium methylsulfate, 2{(Z)-(2,5-dimethoxyphenyl)[(2E)-2-(3-methyl-1,3-benzothiazol-2-(3H)-ylidene)hydrazono]methyl}3-(2-hydroxyethyl))-1-methyl-1H-imidazol-3-ium bromide, 4-[(E)-({bis[4-(dimethylamino)phenyl]methylene}hydrazono)-methyl]-1-(2-hydroxyethyl)pyridinium bromide, 4-[(E)-({bis[4-(dimethylamino)phenyl]methylene}hydrazono)methyl]-1-(2-hydroxyethyl)quinolinium bromide, 4-((E){[bis(4-methoxy-phenyl)methylene]hydrazono}methyl)-1-methylpyridinium methylsulfate, 4-[(E)-({bis[4-(dimethylamino)phenyl]methylene}hydrazono)methyl]-1-methylpyridinium methylsulfate, 4-[(E)-({bis[4-(diethylamino)phenyl]methylene}hydrazono)methyl]-1-methylpyridinium methylsulfate, 4-[(E)-(9H-fluoren-9-ylidenehydrazono)methyl]-1-methylpyridinium methylsulfate, 3-[(E)-({bis[4-(dimethylamino)phenyl]methylene}hydrazono)methyl]-1-methylpyridinium methylsulfate, 4-{(E)-[(2Z)-2-(3,4-dimethyl-1,3-thiazol-2(3H)-ylidene)hydrazono]methyl}-1-methylpyridinium methylsulfate and 4-[(E)-({bis[4-(dimethylamino)phenyl]methylidene}hydrazono)methyl]-1-methylquinolinium methylsulfate.

Preferred compounds of general formulas (I) and (II) are 1-(2-hydroxyethyl)-3-{(Z)-[(2E)-2-(3-methyl-1,3-benzothiazol-2(3H)-ylidene)hydrazono]methyl}pyridinium bromide, 4-{(E)-[(2Z)]-2-(3,4-dimethyl-1,3-thiazol-2(3H)-ylidene)hydrazono]methyl}1-(2-hydroxyethyl)pyridinium bromide, 2-{(E)-[(2Z)-2-(3,4-dimethyl-1,3-thiazol-2(3H)-ylidene)hydrazono]methyl}3-(methyl)-1-methyl-1H-imidazol-3-ium methylsulfate, 3-(2-hydroxyethyl)-1-methyl-2{(Z)-[(2E)-2-(3-methyl-1,3-benzothiazol-2(3H)-ylidene) hydrazono]methyl}-1H-imidazol-3-ium bromide, 1-(2-hydroxyethyl)-4-{(Z)-[(2E)-2-(3-methyl-1,3-benzothiazol-2 (3H)-ylidene)hydrazono]methyl}pyridinium bromide, 4-[(E)-({bis[4-(dimethylamino)phenyl]methylene}hydrazono)methyl]-1-(2-hydroxyethyl)pyridinium bromide, 4-[(E)-({bis[4-dimethylamino)phenyl]methylene}hydrazono)methyl]-1-(2-hydroxyethyl)quinolinium bromide, 4-[(E)-({bis[4-(dimethylamino) phenyl]methylene}hydrazono)methyl]-1-methylpyridinium methylsulfate, 4-[(E)-({bis[4-(diethylamino)phenyl]methylene}hydrazono)methyl]-1-methylpyridinium methylsulfate, 4-[(E)-(9H-fluoren-9-ylidenehydrazono)methyl]-1-methylpyridinium methylsulfate, 3-[(E)-({bis[4-(dimethylamino)phenyl]methylene}hydrazono)methyl]-1-methylpyridinium methylsulfate, 4{(E)-[(2Z)-2-(3,4-dimethyl-1,3-thiazol-2(3H)-ylidene)hydrazono]methyl}-1-methylpyridinium methylsulfate and 4-[(E)-({bis[4-(dimethylamino)phenyl]methylidene}hydrazono)methyl]-1-methylquinolinium methylsulfate.

The cationic heteroarylazine compounds of the invention of general formulas (I) and (II) can be obtained by standard methods from commercially available or readily made components.

For example, aromatic hydrazone compounds can readily be obtained from hydrazine monohydrate and the appropriate ketone or thioketone by the method of S. Huenig et al. (Chem. Eur. J. 2000, 6, No. 14, pages 2618-2632).

The corresponding heteroarylazine compounds of formulas (Ia)/(IIa) can be made by condensation reactions of the hydrazones with heterocyclic aldehydes in a solvent, for example dilute acetic acid. The general synthesis route is shown in Scheme 1.

Scheme 1

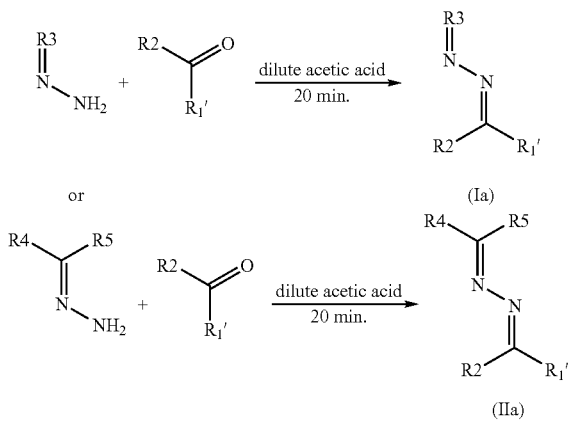

In a subsequent step, the cationic dye of formula (I) or (II) is obtained according to Scheme 2 by quaternization of the heterocyclic nitrogen atom in R1' with an alkylating agent of general formula X-R7.

Scheme 2

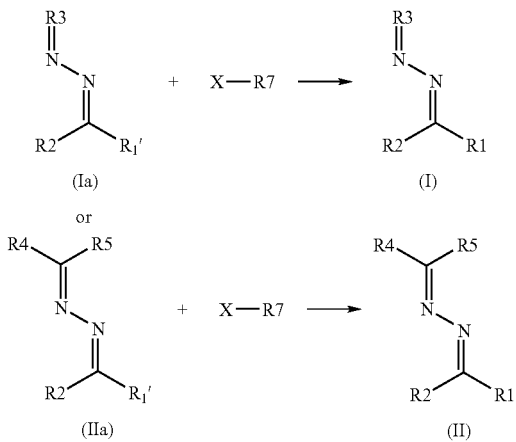

In Schemes 1 and 2, the R1, R2, R4, R5 and R7 groups have the afore-indicated meanings whereas R1' stands for an unquaternized heterocycle of formulas (III) to (VI), and X stands for an uncharged X⁻ group [sic].

The cationic heteroarylazine dyes of general formulas (I) and (II) of the invention allow uniform dyeing of keratin fibers, particularly human hair and give colorations that are resistant to light, perspiration and shampooing. The compounds of general formulas (I) and (II) of the invention impart to keratin fibers, particularly to human hair but also to wool, furs and other fibrous materials, intense, brilliant colorations under mild conditions.

Moreover, special excitation, for example with UV light, often induces pronounced solid-body fluorescence of the dyed fibers.

Furthermore, some compounds of formula (I) or (II) (for example, 1-(2-hydroxyethyl)-3-{(Z)-[(2E)-2-(3-methyl-1,3-benzothiazol-2(3H)-ylidene)hydrazono]methyl}pyridinium bromide or 2{-(E)-[(2Z)-2-(3,4-dimethyl-1,3-thiazol-2(3H)-ylidene)hydrazono]methyl)3-(methyl)-1-methyl-1H-imidazol-3-ium methylsulfate) make it possible to attain natural brightening of untreated natural hair without the addition of a chemical oxidant.

The present invention therefore has for another object
 (a) an agent for non-oxidative dyeing of keratin fibers, particularly human hair,
 (b) an agent for the simultaneous brightening and dyeing of keratin fibers which besides the dyes of formula (I) and (II) contains an oxidant, and
 (c) an oxidative colorant for keratin fibers based on at least one oxidation dye precursor, the agents (a), (b) and (c) being characterized in that they each contain at least one derivative of general formula (I) or (II).

The colorants of the invention contain the cationic heteroarylazine dyes of general formulas (I) and (II) preferably in a total amount from 0.01 to 10 weight percent and particularly from 0.1 to 8 weight percent.

Besides the dyes of general formulas (I) and (II), colorant (a) of the invention can also contain other known direct dyes from the group consisting of nitro dyes, azo dyes, anthraquinone dyes and triphenylmethane dyes, for example:

1,4-bis[(2-hydroxyethyl)amino]-2-nitrobenzene, 1-(2-hydroxyethyl)amino-2-nitro4-[di(2-hydroxyethyl)amino]benzene (HC Blue No. 2), 1-amino-3-methyl-4-[(2-hydroxyethyl)amino]-6-nitrobenzene (HC Violet No. 1), 4-[ethyl-(2-hydroxyethyl)amino]-1-[(2-hydroxyethyl)-amino]-2-nitrobenzene hydrochloride (HC Blue No. 12), 1-[(2,3-dihydroxypropyl)amino]-4-[methyl-(2-hydroxyethyl)amino]-2-nitrobenzene (HC Blue No. 10), 1-[(2,3-dihydroxypropyl)amino]-4-[ethyl-(2-hydroxyethyl)amino]-2-nitrobenzene hydrochloride (HC Blue No. 9), 1-(3-hydroxypropylamino)-4-[di(2-hydroxyethyl)amino]-2-nitrobenzene (HC Violet No. 2), 1-amino-4-[(2-hydroxyethyl)amino]-2-nitrobenzene (HC Red No. 7), 2-amino-4,6-dinitrophenol, 1,4-diamino-2-nitrobenzene (C.I. 76070), 4-amino-2-nitrodiphenylamine (HC Red No. 1), 1-amino-4-[di(2-hydroxyethyl)amino]-2-nitrobenzene hydrochloride (HC Red No. 13), 1-amino-5-chloro-4-[(2-hydroxyethyl)amino]-2-nitrobenzene, 4-amino-1-[(2-hydroxyethyl)amino]-2-nitrobenzene (HC Red No. 3), 4-amino-2-nitro-1-(prop-2-en-1-yl)amino)benzene 4-amino-3-nitrophenol, 4-[(2-hydroxyethyl)amino]-3-nitrophenol, 4-[(2-nitrophenyl)amino]phenol (HC Orange No. 1), 1-[(2-aminoethyl)amino]-4-(2-hydroxyethoxy)-2-nitrobenzene (HC Orange No. 2), 4-(2,3-di-hydroxypropoxy)-1-[(2-hydroxyethyl)amino]-2-nitrobenzene (HC Orange No. 3), 1-amino-5-chloro-4-[(2,3-dihydroxypropyl)amino]-2-nitrobenzene (HC Red No. 10), 5-chloro-1,4-[di(2,3-dihydroxypropyl)amino]-2-nitrobenzene (HC Red No. 11), 2-[(2-hydroxyethyl)amino]4,6-dinitrophenol, 4-ethylamino-3-nitrobenzoic acid, 2-[(4-amino-2-nitrophenyl)amino] benzoic acid, 2-chloro-6-ethylamino-4-nitrophenol, 2-amino-6-chloro-4-nitrophenol, 4-[(3-hydroxypropyl)amino]-3-nitrophenol, 2,5-diamino-6-nitropyridine, 3-amino-6-(methylamino)-2-nitropyridine, 1,2,3,4-tetrahydro-6-nitroquinoxaline, 7-amino-3,4-dihydro-6-nitro-2H-1,4-benzoxazine (HC Red No.14), 1,2-diamino4-nitrobenzene (C.I. 76020), 1-amino-2-[(2-hydroxyethyl)amino]-5-nitrobenzene (HC Yellow No. 5), 1-(2-hydroxyethoxy)-2[(2-hydroxyethyl)amino]-5-nitrobenzene (HC Yellow No. 4), 1-[(2-hydroxyethyl)amino]-2-nitrobenzene (HC Yellow No. 2), 2-[(2-hydroxyethyl)amino]-1-methoxy-5-nitrobenzene, 2-amino-3-nitrophenol, 1-amino-2-methyl-6-nitrobenzene, 1-(2-hydroxyethoxy)-3-methylamino-4-nitrobenzene, 2,3-(dihydroxypropoxy)-3-methylamino-4-nitrobenzene, 2-[(2-hydroxyethyl)amino]-5-nitrophenol (HC Yellow No. 11), 3-[(2-aminoethyl)amino]-1-methoxy-4-nitrobenzene hydrochloride (HC Yellow No. 9), 1-[(2-ureidoethyl)amino]-4-nitrobenzene. 4-[(2,3-dihydroxypropyl)amino]-3-nitro-1-trifluoromethylbenzene (HC Yellow No. 6), 1-chloro-2,4-bis-[(2-hydroxyethyl)-amino]-5-nitrobenzene (HC Yellow No. 10), 4-[(2-hydroxyethyl)amino]-3-nitro-1-methylbenzene, 1-chloro-4-[(2-hydroxyethyl)amino]-3-nitrobenzene (HC Yellow No. 12), 4-[(2-hydroxyethyl)amino]-3-nitro-1-trifluoromethylbenzene (HC Yellow No. 13), 4-[(2-hydroxyethyl)amino]-3-nitrobenzonitrile (HC Yellow No. 14), 4-[(2-hydroxyethyl)amino]-3-nitrobenzamide (HC Yellow No. 15), 2,4-dinitro-1-hydroxynaphthalene, 1,4-di[(2,3-dihydroxypropyl)amino]-9,10-anthraquinone, 1,4-di[(2-hydroxyethyl)amino]-9,10-anthraquinone (C.I. 61545, Disperse Blue 25), 1-amino-4-hydroxy-9,10-anthraquinone (C.I. 60710, Disperse Red 15), 1-hydroxy-4-[(4-methyl-2-sulfophenyl)amino]-9,10-anthraquinone, 7-beta-D-glu-copyranosyl-9,10-dihydro-1-methyl-9,10-diketo-3,5,6,8-tetrahydroxy-2-anthracenecarboxylic acid (C.I. 75470, Natural Red 4), 1-[(3-aminopropyl)amino]-9,10-anthraquinone (HC Red No. 8), 1,4-diamino-9,10-anthraquinone (C.I. 61100, Disperse Violet No.1), 1-amino-4-(methylamino)-9,10-anthraquinone (C.I. 61105, Disperse Violet No. 4, Solvent Violet No. 12), N-(6-((3-chloro-4-(methylamino)phenyl)imino)-4-methyl-3-keto-1,4-cyclohexadien-1-yl)urea (HC Red No. 9), 2-((4-(di(2-hydroxyethyl)amino)phenyl)amino)-5-[(2-hydroxyethyl)amino]-2,5-cyclohexadiene-1,4-dione (HC Green No. 1), 2-hydroxy-1,4-naphthoquinone (C.I. 75480, Natural Orange No. 6), 1,2-dihydro-2-(1,3-dihydro-3-keto-2H-indol-2-ylidene)-3H-3-one C.I. 73000), 1,3-bis(di-cyanomethylene)indane, di[4-(diethylamino)phenyl][4-(ethylamino)naphthyl]carbenium chloride (C.I. 42595; Basic Blue No. 7), di[4-(dimethylamino)phenyl][4-(phenylamino)naphthyl] carbenium chloride (C.I. 44045; Basic Blue No. 26), Basic Blue No. 77, 8-amino-2-bromo-5-hydroxy-4-imino-6-{[3-(trimethylammonio)phenyl]amino}-1(4H)-naphthalenone chloride (C.I. 56059; Basic Blue No. 99), tris(4-amino-3-methylphenyl)carbenium chloride (C.I. 42520; Basic Violet No. 2), di(4-aminophenyl)(4-amino-3-methylphenyl)carbenium chloride (C.I. 42510; Basic Violet No. 14), 1-[(4-aminophenyl)azo]-7-(trimethylammonio)-2-naphthol chloride (C.I. 12250; Basic Brown No. 16), 3-[(4-amino-2,5-dimethoxyphenyl)azo]-N,N,N-trimethylbenzenaminium chloride (C.I. 112605; Basic Orange No. 69), 1-[(4-amino-2-nitrophenyl)azo]-7-(trimethylammonio)-2-naphthol chloride (Basic Brown No. 17), 1-[(4-amino-3-nitrophenyl)azo]-7-(trimethylammonio)-2-naphthol chloride (C.I. 12251; Basic Brown No.17) [sic], 2-[(4-aminophenyl)azo]-1,3-dimethyl-1H-imidazol-3-ium chloride (Basic Orange No. 31), 3,7-diamino-2,8-dimethyl-5-phenylphenazinium chloride (C.I. 50240; Basic Red No. 2), 1,4-dimethyl-5-{[4-(dimethylamino)phenyl]azo}-1,2,4-triazolium chloride (C.I. 11055; Basic Red No. 22), 1,3-dimethyl-2-[(4-dimethylamino)phenyl]azo-1H-imidazol-3-ium chloride (Basic Red No. 51), 2-hydroxy-1-[(2-methoxyphenyl)azo]-7-(trimethylammonio)naphthalene chloride (C.I. 12245; Basic Red No. 76), 3-methyl-1-phenyl-4[(3-(trimethylammonio)phenyl]azo}pyrazol-5-one chloride (C.I. 12719; Basic Yellow No. 57), 1-methyl-4-[(methylphenylhydrazono)methyl]pyridinium methylsulfate (Basic Yellow No. 87), 1-(2-morpholiniumpropylamino)-4-hydroxy-9,10-anthraquinone methylsulfate, 1-{[3-(dimethylpropylaminium)propyl]amino}-4-(methylamino)-9,10-anthraquinone chloride, 1-[di(2-hydroxyethyl)amino]-3-methyl-4-[(4-nitrophenyl)azo] benzene (C.I. 11210; Disperse Red No. 17), 1-[di(2-hydroxyethyl)amino]-4-[(4-nitrophenyl)azo]benzene (Disperse Black No. 9), 4-[(4-aminophenyl)azo]-1-[di(2-hydroxyethyl)amino]-3-methylbenzene (HC Yellow No. 7), 2,6-diamino-3-[(pyridin-3-yl)azo]pyridine and 2-{[4-(ethyl(2-hydroxyethyl)amino)-2-methylphenyl]azo}-5-nitro-1,3-thiazole (C.I. 111935; Disperse Blue No. 106), alone or in admixture with one another.

Colorant (b) of the invention, which is characterized by the fact that it contains an oxidant, preferably hydrogen peroxide and/or a persulfate or perborate and particularly a persulfate, or a mixture of hydrogen peroxide and a persulfate, can contain besides the dyes of general formula (I) and (II) also other oxidation-resistant direct dyes, for example 3-(2',6'-diaminopyridyl-3'-azo)pyridine (=2,6-diamino-3-[(pyridin-3-yl)azo]pyridine), 2-((4-ethyl(2-hydroxyethyl)amino)-2-methylphenyl)azo-5-nitro-1,3-thiazole (Disperse Blue 106), N,N-di(2-hydroxyethyl)-3-methyl-4-[(4-nitrophenyl)azo]aniline (Disperse Red 17; C.I. 11210), 3-diethylamino-7-(4-dimethylaminophenylazo)-5-phenylphenazinium chloride (C.I. 11050), 4-(2-thiazolylazo)resorcinol, 4-[(4-phenylamino)azo]benzenesulfonic acid sodium salt (Orange IV), 1-[(3-aminopropyl)amino]-9,10-anthracenedione (HC Red No. 8), 3',3",4,5,5',5",6,7-octabromophenolsulfonphthalein (Tetrabromophenol Blue), 1-[(4-amino-3,5-dimethylphenyl)-(2,6-dichlorophenyl)methylene]-3,5-dimethyl-4-imino-2,5-cyclohexadienephosphoric acid (1:1) (Basic Blue 77), 3',3",5",5"-tetrabromo-m-cresolsulfonphthalein, 2,4-dinitro-1-naphthol-7-sulfonic acid disodium salt (Acid Yellow 1; C.I. 10316), 4-[2'-hydroxy-1'-naphthyl)azo]benzene]sulfonic acid sodium salt (Acid Orange 7; C.I. 15510), 3',6'-dihydroxy-2',4',5',7'-tetraiodospiro[isobenzofuran-1(3H), 9'(9H)xanthen]-3-one disodium salt (Acid Red 51; C.I. 45430), 6-hydroxy-5-[(2-methoxy-5-methyl-4-sulfophenyl)azo]-2-naphthalenesulfonic acid disodium salt (FD&C Red 40; C.I. 16035), 2,4-dinitro-1-naphthol sodium salt (Acid Yellow 24; C.I. 10315), 2',4',5',7'-tetrabromo4,5,6,7-tetrachloro-3',6'-dihydroxyspiro{isobenzofuran-1 (3H), 9'[9H]xanthen}-3-one disodium salt (Acid Red 92; C.I. 45410),4-(2-hydroxy-1-naphthylazo)-3-methylbenzenesulfonic acid sodium salt (Acid Orange 8; C.I. 15575), 2-amino-1,4-naphthalenedione, dithizone (1,5-diphenylthiocarbazone).

The colorant of the invention can contain the afore-said direct dyes in a total amount from about 0.01 to 4 weight percent, the total amount of dyes in the colorant of the invention preferably being from 0.01 to 10 weight percent and particularly from 0.1 to 5 weight percent.

Oxidation colorant (c) of the invention, which before use is mixed with an oxidant (preferably hydrogen peroxide or an addition compound thereof), contains besides the dyes of general formulas (I) and (II) also oxidation dye precursors. Suitable oxidation dye precursors are, for example, the following developers, couplers and self-coupling compounds:

(i) Developers: 1,4-diaminobenzene (p-phenylenediamine), 1,4-diamino-2-methylbenzene (p-toluylenediamine), 1,4-diamino-2,6-dimethylbenzene, 1,4-diamino-3,5-diethylbenzene, 1,4-diamino-2,5-dimethylbenzene, 1,4-diamino-2,3-dimethylbenzene, 2-chloro-1,4-diaminobenzene, 1,4-diamino-2-(thiophen-2-yl)benzene, 1,4-diamino-2-(thiophen-3-yl)benzene, 1,4-diamino-2-(pyridin-3-yl)benzene, 2,5-diaminobiphenyl, 1,4-diamino-2- methoxymethylbenzene, 1,4-diamino-2-aminomethylbenzene, 1,4-diamino-2-hydroxymethylbenzene, 1,4-diamino-2-(2-hydroxyethoxy)benzene, 2-[(2-acetylamino)ethoxy]-1,4-diaminobenzene, 4-phenylaminoaniline, 4-dimethylaminoaniline, 4-diethylaminoaniline, 4-dipropylaminoaniline, 4-[ethyl(2-hydroxyethyl)amino]aniline, 4-[di(2-hydroxyethyl)amino]aniline, 4-[di(2-hydroxyethyl)amino-2-methylaniline, 4-[(2-methoxyethyl)amino]aniline, 4-[(3-hydroxypropyl)amino]aniline, 4-[(2,3-dihydroxypropyl)amino]aniline, 1,4-diamino-2-(2-hydroxyethyl)benzene, 1,4-diamino-2-(1-methylethyl)benzene, 1,3-bis[(4-aminophenyl)(2-hydroxyethyl)amino]-2-propanol, 1,4-bis[(4-aminophenyl)amino]butane, 1,8-bis-(2,5-diaminophenoxy)-3,6-dioxaoctane, 4-aminophenol, 4-amino-3-methylphenol, 4-amino-3-(hydroxymethyl)phenol, 4-amino-3-fluorophenol, 4-methylaminophenol, 4-amino-2-(aminomethyl)phenol, 4-amino-2-(hydroxymethyl)phenol, 4-amino-2-fluorophenol, 4-amino-2-[(2-hydroxyethyl)amino]methylphenol, 4-amino-2-methylphenol, 4-amino-2-(methoxymethyl)phenol, 4-amino-2-(2-hydroxyethyl)phenol, 5-aminosalicylic acid, 2,5-diaminopyridine, 2,4,5,6-tetraaminopyrimidine, 2,5,6-triamino-4-(1 H)-pyrimidone, 4,5-diamino-1-(2-hydroxyethyl)-1H-pyrazole, 4,5-diamino-1-(1-methylethyl)-1H-pyrazole, 4,5-diamino-1-[(4-methylphenyl)methyl]-1H-pyrazole, 1-[(4-chlorophenyl)methyl]-4,5-diamino-1H-pyrazole, 4,5-diamino-1-methyl-1H-pyrazole, 2-aminophenol, 2-amino-6-methylphenol and 2-amino-5-methylphenol, alone or in admixture with one another.

(ii) Couplers: N-(3-dimethylaminophenyl)urea, 2,6-diaminopyridine, 2-amino-4-[(2-hydroxyethyl)amino]anisole, 2,4-diamino-1-fluoro-5-methylbenzene, 2,4-diamino-1-methoxy-5-methylbenzene, 2,4-diamino-1-ethoxy-5-methylbenzene, 2,4-diamino-1-(2-hydroxyethoxy)-5-methylbenzene, 2,4-di[(2-hydroxyethyl)amino-1,5-dimethoxybenzene, 2,3-diamino-6-methoxypyridine, 3-amino-6-methoxy-2-(methylamino)pyridine, 2,6-diamino-3,5-dimethoxypyridine, 3,5-diamino-2,6-dimethoxypyridine, 1,3-diaminobenzene, 2,4-diamino-1-(2-hydroxyethoxy)benzene, 1,3-diamino-4-(2,3-dihydroxypropoxy)benzene, 2,4-diamino-1,5-di(2-hydroxyethoxy)benzene, 1-(2-aminoethoxy)-2,4-diaminobenzene, 2-amino-1-(2-hydroxyethoxy)-4-methylaminobenzene, 2,4-diaminophenoxyacetic acid, 3-[di(2-hydroxyethyl)amino]aniline, 4-amino-2-di[(2-hydroxyethyl)amino]-1-ethoxybenzene, 5-methyl-2-(1-methylethyl)phenol, 3-[(2-hydroxyethyl)amino]aniline, 3-[(2-aminoethyl)amino]aniline, 1,3-di-(2,4-diaminophenoxy)propane, di(2,4-diaminophenoxy)methane, 1,3-diamino-2,4-dimethoxybenzene, 2,6-bis(2-hydroxyethyl)aminotoluene, 4-hydroxyindole, 3-dimethylaminophenol, 3-diethylaminophenol, 5-amino-2-methylphenol, 5-amino-4-fluoro-2-methylphenol, 5-amino4-methoxy-2-methylphenol, 5-amino4-ethoxy-2-methylphenol, 3-amino-2,4-dichlorophenol, 5-amino-2,4-dichlorophenol, 3-amino-2-methylphenol, 3-amino-2-chloro-6-methylphenol, 3-aminophenol, 2-[(3-hydroxyphenyl)amino]acetamide, 5-[(2-hydroxyethyl)amino]-4-methoxy-2-methylphenol, 5-[(2-hydroxyethyl)amino]-2-methylphenol, 3[(2-hydroxyethyl)amino]phenol, 3-[(2-methoxyethyl)amino]phenol, 5-amino-2-ethylphenol, 5-amino-2-methoxyphenol, 2-(4-amino-2-hydroxyphenoxy)ethanol, 5-[(3-hydroxypropyl)-amino]-2-methylphenol, 3-[(2,3-dihydroxypropyl)amino]-2-methylphenol, 3-[(2-hydroxyethyl)amino]-2-methylphenol, 2-amino-3-hydroxypyridine, 5-amino-4-chloro-2-methylphenol, 1-naphthol, 5-amino-2-methoxyphenol, 2-methyl-1-naphthol, 1,5-dihydroxynaphthalene, 1,7-dihydroxynaphthalene, 2,3-dihydroxynaphthalene, 2,7-dihydroxynaphthalene, 2-methyl-1-naphthol acetate, 1,3-dihydroxybenzene, 1-chloro-2,4-dihydroxybenzene, 2-chloro-1,3-dihydroxybenzene, 1,2-dichloro-3,5-dihydroxy-4-methylbenzene, 1,5-dichloro-2,4-dihydroxybenzene, 1,3-dihydroxy-2-methylbenzene, 3,4-methylenedioxyphenol, 3,4-methylenedioxyaniline, 5-[(2-hydroxyethyl)amino]-1,3-benzodioxol, 6-bromo-1-hydroxy-3,4-methylenedioxybenzene, 3,4-diaminobenzoic acid, 3,4-dihydro-6-hydroxy-1,4(2H)-benzoxazine, 6-amino-3,4-dihydro-1,4(2H)-benzoxazine, 3-methyl-1-phenyl-5-pyrazolone, 5,6-dihydroxyindole, 5,6-dihydroxyindoline, 5-hydroxyindole, 6-hydroxyindole, 7-hydroxyindole and 2,3-indolinedione, alone or in admixture with one another (iii) Self-coupling compounds: 2-amino-5-methylphenol, 2-amino-6-methylphenol, 2-amino-5-ethoxyphenol and 2-propylamino-5-aminopyridine.

The total amount of oxidation dye precursors contained in the colorant of the invention (c) is about 0.01 to 12 weight percent and particularly about 0.2 to 6 weight percent.

In addition, the colorant of the invention (a), (b) or (c) can contain any common and known additives used in such preparations, for example perfume oils, complexing agents, waxes, preservatives, thickeners, antioxidants, alginates, guar gum, hair-care substances, for example cationic polymers or lanolin derivatives, or anionic, nonionic, amphoteric or cationic surface-active substances. Preferably used are amphoteric or nonionic surface-active substances, for example betaine surfactants, propionates and glycinates, for example cocoamphoglycinates or cocoamphodiglycinates, ethoxylated surfactants with 1 to 1000 ethylene oxide units, preferably with 1 to 300 ethylene oxide units, for example glyceride alkoxylates, for example castor oil ethoxylated with 25 ethylene oxide units, polyglycol amides, ethoxylated alcohols, ethoxylated fatty alcohols (fatty alcohol alkoxylates) and ethoxylated fatty acid esters of sugars, particularly ethoxylated sorbitan fatty acid esters. The afore-said constituents are used in amounts commonly employed for such purposes, for example the surface-active substances at a concentration of 0.1 to 30 weight percent and the hair-care agents in an amount from 0.1 to 5 weight percent.

The colorant (a), (b) or (c) of the invention, particularly when it is a hair colorant, can be in the form of a powder or granulate which before use is dissolved in an aqueous or aqueous-alcoholic preparation or in an aqueous or aqueous-alcoholic solution, or in the form of a cream, gel, emulsion or aerosol foam. The hair colorant can be in the form of a one-component or a multicomponent preparation, for example in the form of a two-component preparation wherein the dye derivative of general formula (I) and (II) is packaged separately from the other constituents, and the ready-to-use hair colorant is prepared just before use by mixing the two components.

The colorant (a), (b) or (c) of the invention has a pH of about 2 to 11, preferably about 5 to 10 and particularly a neutral to basic pH of about 7 to 10. Both organic and inorganic acids or bases are suitable for the adjustment of the pH according to the invention. Suitable acids are in particular, the following: α-hydroxycarboxylic acids, for example glycolic, lactic, tartaric, citric and malic acid, ascorbic acid, gluconolactone, acetic acid, hydrochloric acid or phosphoric acid and mixtures of said acids. Suitable bases are, in particular, sodium carbonate, sodium hydrogen carbonate, alkanolamines, for example monoethanolamine and triethanolamine, ammonia, aminomethylpropanol and sodium hydroxide as well as mixtures thereof.

Depending on the application, the colorant of the invention can be used with one or more oxidants (brightening; oxidative colorant) or without an oxidant (non-oxidative colorant).

As a rule, the colorant (a), (b) or (c) of the invention is used by applying to the hair an amount thereof sufficient for hair dyeing, namely about 30 to 120 grams depending on the hair length, allowing the hair colorant to act at about 15 to 45° C. for about 1 to 60 minutes and preferably for 5 to 30 minutes, then rinsing the hair thoroughly with water, optionally washing it with a shampoo and then drying it.

If necessary, the agent is mixed with an oxidant before use.

Moreover, if no oxidants are added to the dyeing composition, the afore-described colorant can contain natural or synthetic polymers or modified polymers of natural origin commonly used in cosmetic products whereby the hair is fixed at the same time it is dyed. Such agents are generally referred to as tint fixatives or dye fixatives. Synthetic polymers that are suitable for this purpose in the cosmetic field are, for example, polyvinylpyrrolidone, polyvinyl acetate, polyvinyl alcohol and polyacrylic compounds such as polyacrylic acid or polymethacrylic acid, basic polymers of esters of polyacrylic acid or polymethacrylic acid with aminoalcohols, for example the salts or quaternization products thereof, polyacrylonitrile, polyvinyl acetate and the copolymers of such compounds, for example polyvinylpyrrolidone—vinyl acetate copolymers. Suitable natural polymers or modified natural polymers are, for example, chitosan (deacetylated chitin) and chitosan derivatives.

The afore-said polymers can be contained in the colorant (a) of the invention in an amount commonly used for such agents, particularly in an amount from about 1 to 5 weight percent. The pH of the tint fixing agent or dye fixing agents of the invention is preferably about 6 to 9.

The hair colorant with additional fixing action is used in the known and common manner by moistening the hair with the fixative, fixing (arranging) the hair into a hairdo and then drying.

The colorants (a), (b) and (c) of the invention produce a uniform, intense and lasting coloration on the keratin fibers (for example human hair, wool or furs) without appreciably staining the skin or the scalp. Even in the case of colorant (a) the said coloration withstands five or more hair washings without appreciable fading.

The following examples will explain the subject matter of the invention without limiting it to these examples.

EXAMPLES

Example 1

Preparation of 1-(2-hydroxyethyl)-3{(Z)-[(2E)-2-(3-methyl-1,3-benzothiazol-2(3H)-ylidene)hydrazono]methyl}pyridinium bromide Step 1: Preparation of nicotine aldehyde ((2E)-3-methyl-1,3-benzothiazol-2(3H)-ylidene) hydrazone 1.50 g (6.42 mmol) of 2,3-dihydro-3-methyl-2-benzothiazolone hydrazone hydrochloride and 0.69 g (6.42 mmol) of 3-pyridinecarboxaldehyde in 10% acetic acid were stirred at room temperature for 30 minutes. The mixture was then made slightly alkaline with 2N sodium hydroxide solution and the precipitate was suction-filtered off, washed with water and dried under vacuum.

Yield: 1.21 g (70% of the theoretical), pale-yellow needles $^1$H-NMR (CDCl$_3$/3300 MHz): δ=3.64 (s, 3H, methyl), 7.05-7.13 (m, 2H, phenyl), 7.28 -7.37 (m, 2H, phenyl), 7.46 (d, J=8.4 Hz, 1H, pyridyl), 8.15 (d, J=11.4 Hz, 1H, pyridyl) 8.39 (s, 1H, olefin), 8.59 (d, J=8.4 Hz, 1H, pyridyl), 8.90 (s, 1H, pyridyl).

Step 2: Preparation of 1-(2-hydroxyethyl))-3{(Z)-[(2E)-2-(3-methyl-1,3-benzothiazol-2(3H)-ylidene)hydrazono]methyl}pyridinium bromide 1.21 g (4.51 mmol) of nicotine aldehyde ((2E)-3-methyl-1,3-benzothiazol-2(3H)-ylidene hydrazone from Step 1 and 0.85 g (6.76 mmol) of bromoethanol in acetonitrile were heated at reflux for 2 hours. After the solvent was removed, the precipitate was suction-filtered off, washed with ethyl acetate and dried under vacuum.

Yield: 1.20 g (68% of the theoretical), bright-yellow powder

Melting point: 181° C.

Example 2

Preparation of 4{-(E)-[(2Z)-2-(3,4-dimethyl-1,3-thiazol-2(3H)-ylidene)-hydrazono]methyl}1-(2-hydroxyethyl)pyridinium bromide Step 1: Preparation of isonicotinic aldehyde ((2Z)-3,4-dimethyl-1,3-thiazol-2(3H)-ylidene)hydrazone As in Example 1, 0.20 g (1.12 mmol) of N-methyl-5-methyl-2-thiazole hydrazone hydrochloride and 0.12 g (1.12 mmol) of 4-pyridinecarboxaldehyde in 10% acetic acid were stirred at room temperature for 30 minutes. The mixture was then rendered slightly alkaline with 2N sodium hydroxide solution. The precipitate was suction-filtered off, washed with water and dried under vacuum.

Yield: 0.18 g (70% of theoretical), orange-yellow needles $^1$H-NMR (CDCl3/300 MHz): δ=2.17 (s, 3H, methyl), 3.39 (s, 3H, methyl), 6.16 (s, 1H, thiazole), 7.58 (d, J=6.0 Hz, 2H, pyridyl), 8,21 (s, 1H, olefin), 8.56 (d, J=6.0 Hz, 2H, pyridyl).

Step 2: Preparation of 4-{(E)-[(2Z)-2-(3,4-dimethyl-1,3-thiazol-2(3H-ylidene)hydrazomo]methyl}1-(2-hydroxyethyl)pyridinium bromide 0.15 g (0.64 mmol) of isonicotinic aldehyde ((2Z)-3,4-dimethyl-1,3-thiazol-2(3H)-ylidene)hydrazone from Step 1 and 0.12 g (0.96 mmol) of bromoethanol in acetonitrile were heated at reflux for 2 hours. After the solvent was removed, the precipitate was suction-filtered off, washed with ethyl acetate and dried under vacuum.

Yield: 0.11 g (49% of the theoretical), red powder

Melting point: 169° C.

Example 3

Preparation of 4-[(E)-(9H)-fluoren-9-ylidenehydrazono)methyl]-1-methylpyridinium methylsulfate

Step 1: Preparation of isonicotinic aldehyde 9H-fluoren-9-ylidene hydrazone

As in Example 1, 1.50 g (7.72 mmol) of 9-fluorenone hydrazone and 0.82 g (7.72 mmol) of 4-pyridinecarboxaldehyde in 10% acetic acid were stirred at room temperature for 30 minutes. The mixture was then rendered slightly alkaline with 2N sodium hydroxide solution. The precipitated crystals were suction-filtered off, washed with water and dried under vacuum. The aqueous phase was then extracted with ethyl acetate to isolate the product that had not precipitated.

Yield: 1.95 g (89% of the theoretical), dark-yellow powder
$^1$H-NMR (CDCl$_3$/300 MHz): δ=7.32-7.44 (m, 2H, fluorene), 7.54-7.60 (m, 2H, fluorene), 7.83-7.92 (m, 2H, fluorene), 7.02-7.05 (m, 1H, fluorene), 8.56 (d, J=6.9 Hz, 2H, pyridyl), 8.81 (s, 1H, olefin), 8.12 (d, J=6.9 Hz, 2H, pyridyl).

Step 2: Preparation of 4-[(E)-(9H-fluoren-9-ylidenehydrazono)methyl]-1-methylpyridinium methylsulfate 0.84 g (2.96 mmol) of isonicotinic aldehyde 9H-fluoren-9-ylidene hydrazone from Step 1 and 0.56 g (4.44 mmol) of dimethyl sulfate in acetone were heated at reflux for 45 minutes. After the solvent was removed, the precipitate was suction-filtered off, washed with ethyl acetate and dried under vacuum.

Yield: 1.02 g (84% of the theoretical), light-yellow powder
Melting point: 224° C.

Example 4

Step 1: Preparation of 1-(2-hydroxyethyl)4-{(Z)-[(2E)-2-(3-methyl-1,3-benzothiazol-2(3H)-ylidene)hydrazono]methyl}pyridinium bromide As in Example 1, 2.00 g (8.56 mmol) of 2,3-dihydro-3-methyl-2-benzothiazolone hydrazone hydrochloride and 0.92 g (8.56 mmol) of 4-pyridinecarboxaldehyde in 10% acetic acid were stirred at room temperature for 30 minutes. The mixture was then rendered slightly alkaline with 2N sodium hydroxide solution. The precipitated crystals were suction-filtered off, washed with water and dried under vacuum.

Yield: 2.05 g (89% of the theoretical), pale-yellow needles
$^1$H-NMR (CDCl$_3$ 300 MHz): δ=3.66 (s, 3H, methyl), 7.07-7.15 (m, 2H, phenyl), 7.30-7.36 (m, 1H, phenyl), 7.46-7.49 (m, 1H, phenyl ), 7.63 (d, J=2.1 Hz, 2H, pyridyl), 8.31 (s, 1H, olefin), 8.66 (d, J=2.1 Hz, 2H, pyridyl).

Step 2: Preparation of 1-(2-hydroxyethyl)4{(Z)-[(2E)-2-(3-methyl-1,3-benzothiazol-2(3H)-ylidene)hydrazono]methyl}pyridinium bromide 1.00 g (3.73 mmol) of isonicotinic aldehyde ((E)-3-methyl-1,3-benzothiazol-2(3H)-ylidene)hydrazone from Step 1 and 0.70 g (5.59 mmol) of bromoethanol in acetonitrile were heated at reflux for 2 hours. After the solvent was removed, the precipitate was suction-filtered off, washed with ethyl acetate and dried under vacuum.

Yield: 0.39 g (27% of the theoretical), bright-red powder
Melting point: 175° C.

Example 5

Preparation of 3-(2-hydroxyethyl)-1-methyl-2-{(Z)-[(2E)-2-(3-methyl-1,3-benzothiazol-2(3H)-ylidene)hydrazono]methyl}-1H-imidazol-3-ium bromide

Step 1: Preparation of 1-methyl-1H-imidazol-2-carboxaldehyde ((2E)-3-methyl-1,3-benzothiazol-2(3H)-ylidene) hydrazone As in Example 1, 1.27 g (5.45 mmol) of 2,3-dihydro-3-methyl-2-benzothiazolone hydra-zone hydrochloride and 0.60 g (5.45 mmol) of 1-methyl-2-imidazolecarboxaldehyde in 40 mL of a mixture of HCl and ethanol (1:2) were stirred at room temperature for 30 minutes. The mixture was then rendered slightly alkaline with 2N sodium hydroxide solution. The precipitated product was suction-filtered off, washed with water and dried under vacuum.

Yield: 1.19 g (81% of the theoretical), colorless needles
$^1$H-NMR (CDCl$_3$/300 MHz): δ=3.62 (s, 3H, methyl), 4.01 (s, 3H, methyl), 6.98-7.12 (m, 3H, phenyl), 7.28 (m, 1H, phenyl), 7.33 (d, J=8.7 Hz, 1H, imidazolyl), 7.42 (d, J=8.4 Hz, 1H, imidazolyl), 8.46 (s, 1H, olefin).

Step 2: Preparation of 3-(2-hydroxyethyl)-1-methyl-2{(Z)-[(2E)-2-(3-methyl-1,3-benzothiazol-2(3H)-ylidene)hydrazono]methyl}-1H-imidazol-3-ium bromide 1.00 g (3.68 mmol) of 1-methyl-1H-imidazol-2-carboxaldehyde [(2E)-3-methyl-1,3-benzothiazol-2(3H)-ylidene] hydrazone from Step 1 and 0.69 g (5.52 mmol) of bromoethanol in acetonitrile were heated at reflux for 2 hours. After the solvent was removed, the precipitate formed was suction-filtered off, washed with ethyl acetate and dried under vacuum.

Yield: 1.03 g (71% of the theoretical), green-yellow powder
Melting point: 242° C.

Example 6

Preparation of 4-[(E)-({bis[4-(dimethylamino)phenyl]methylene}hydrazono)-methyl]-1-methylpyridinium methylsulfate

Step 1: Preparation of isonicotinic aldehyde{bis[-4-(dimethylamino)phenyl]methylene} hydrazone 1.66 g (5.66 mmol) of bis[4-(dimethylamino)phenyl]methanone hydrazone and 0.63 g (5.88 mmol) of 4-pyridinecarboxaldehyde in 40 mL of 10% acetic acid were stirred at room temperature for 30 minutes. The mixture was then rendered slightly alkaline with 2N sodium hydroxide solution. The precipitated product was suction-filtered off, washed with water and dried under vacuum. The aqueous phase was then extracted with ethyl acetate to isolate unprecipitated product.

Yield: 1.98 g (91% of the theoretical), orange needles
$^1$H-NMR (CDCl$_3$/300 MHz): δ=3.05 (s, 12H, 4 methyl groups), 6.73 (d, J=8.7 Hz, 4H, phenyl), 7.32 (d, J=8.7 Hz, 2H, phenyl), 7.58 (d, J=5.7 Hz, 2H, pyridyl), 7.56 (d, J=9.0 Hz, 2H, phenyl), 8.63 (d, J=5.4 Hz, 2H, pyridyl).

Step 2: Preparation of 4-[(E)-({bis[4-(dimethylamino)phenyl]methylene}hydrazono)-methyl]-1-methylpyridinium methylsulfate 0.54 g (1.46 mmol) of isonicotinic aldehyde {bis[4-(dimethylamino)phenyl]methylene} hydrazone from Step 1 and 0.92 g (7.30 mmol) of dimethyl sulfate in acetone were heated at reflux for 45 minutes. After the solvent was removed, the precipitate was suction-filtered off, washed with ethyl acetate and dried under vacuum.

Yield: 0.64 g (88% of the theoretical), dark-red powder
Melting point: 202° C.

Example 7

Preparation of 3-[(E)-({bis[4-(dimethylamino)phenyl]methylene}hydrazono)-1-methylpyridinium methylsulfate

Step 1: Preparation of nicotinic aldehyde {(bis[4-(dimethylamino)phenyl]methylene} hydrazone As in Example 6, 1.66 g (5.66 mmol) of bis[4-(dimethylamino)phenyl]methanone hydrazone and 0.63 g (5.88 mmol) of 3-pyridinecarboxaldehyde were stirred at room temperature for 30 minutes. The mixture was then rendered slightly alkaline with 2N sodium hydroxide solution. The precipitated product was suction-filtered off, washed with water and dried under vacuum. The aqueous phase was then extracted with ethyl acetate to isolate unprecipitated product.

Yield: 2.04 g (94% of the theoretical), orange-yellow needles $^1$H-NMR (CDCl$_3$/300 MHz): δ=2.98 (s, 12H, 4 methyl groups), 6.96 (d, J=8.6 Hz, 4H, phenyl), 7.30 (d, J=8.7 Hz, 2H, phenyl), 7.46-7.52 (m, 1H, pyridyl), 7.62 (d, J=8.7 Hz, 2H, phenyl), 8.12-8.41, (m, 2H, pyridyl), 8.66 (s, 1H, pyridyl).

Step 2: Preparation of 3-[(E)-({bis[4-(dimethylamino)phenyl]methylene}hydrazono)-methyl]-1-methylpyridinium methylsulfate 0.76 g (2.05 mmol) of nicotinic aldehyde {bis[4-(dimethylamino)phenyl]methylene} hydrazone from Step 1 and 1.29 g (10.25 mmol) of dimethyl sulfate in acetone were heated at reflux for 45 minutes. After the solvent was removed, the precipitate was suction-filtered off, washed with ethyl acetate and dried under vacuum.

Yield: 0.81 g (79% of the theoretical), red powder
Melting point: 193° C.

Example 8

Preparation of 2-{(E)-[(2Z)-2-(3,4-dimethyl-1,3-thiazol-2(3H)-ylidene)hydrazono]methyl}-3-(methyl)-1-methyl-1H-imidazol-3-ium methylsulfate

Step 1: (2Z)-3,4-dimethyl-2-{(2E)-[(1-methyl-1H-imidazol-2-yl)methylidene]hydrazono}-2,3-dihydro-1,3-thiazole As in Example 1, 3.00 g (11.13 mmol) of N-methyl-5-methyl-2-thiazole hydrazone hydrochloride and 1.38 g (12.24 mmol) of 1-methyl-2-imidazolecarboxaldehyde in 10% acetic acid were stirred at room temperature for 30 minutes. The mixture was then rendered slightly alkaline with 2N sodium hydroxide solution. The precipitate was suction-filtered off, washed with water and dried under vacuum.

Yield: 1.50 g (58% of the theoretical), brown powder
$^1$H-NMR (CDCl$_3$/300 MHz): δ=2.17 (s, 3H, methyl), 3.45 (s, 3H, methyl), 4.01 (s, 3H, methyl), 5.77 (s, 1H, thiazole), 6.95 (m, 1H, imidazole), 7.14 (m, 1H, imidazole), 8.43 (s, 1H, olefin).

Step 2: Preparation of 2{(E)-[(2Z)-2-(3,4-dimethyl-1,3-thiazol-2(3H)-ylidene)hydrazono]methyl}-3-(methyl)-1-methyl-1H-imidazol-3-ium methylsulfate 1.40 g (5.95 mmol) of (2Z)-3,4-dimethyl-2-{(2E)-[(1-methyl-1H-imidazol-2-yl)methylidene]hydrazono}-2,3-dihydro-1,3-thiazole from Step 1 and 7.58 9 (59.50 mmol) [sic] of dimethyl sulfate in acetone were heated at reflux for 2 hours. After the solvent was removed, the precipitate was suction-filtered off, washed with ethyl acetate and dried under vacuum.

Yield: 2.04 g (95% of the theoretical), yellow-green powder
Melting point: 186° C.

Examples 9-17

Colorant (Without Oxidant)

| | |
|---|---|
| 2.5 mmol | of dye of general formulas (I) and (II) |
| 5.0 g | of ethanol |
| 4.0 g | of decylpolyglucose |
| 0.2 g | of ethylenediaminetetraacetic acid disodium salt hydrate |
| to 100.0 g | water, demineralized |

The dye solution was adjusted to pH 7 to 10 by addition of ammonia.

The hair was colored by applying to it an amount of colorant sufficient for hair dyeing (Examples 9-16: bleached natural hair; Example 17: light-brown natural hair). After a treatment time of 30 minutes at 40° C., the hair was rinsed with lukewarm water and then dried.

The coloring results are shown in the following Table 1

TABLE 1

| Example No. | Dye as per Example (...) | Coloring Result |
|---|---|---|
| 9 | 1-(2-hydroxyethyl)-3-{(Z)-[(2E)-2-(3-methyl-1,3-benzothiazol-2-(3H)-ylidene)hydrazono]methyl}pyridinium bromide (1) | bright-yellow; strongly fluorescent under UV excitation |
| 10 | 4-{(E)-[(2Z)-2-(3,4-dimethyl-1,3-thiazol-2(3H)-ylidene)-hydrazono]methyl}-1-(2-hydroxyethyl)pyridinium bromide (2) | brilliant light-red |
| 11 | 4-[(E)-(9H-fluoren-9-ylidenehydrazono)methyl]-1-methylpyridinium methylsulfate (3) | yellow |
| 12 | 1-(2-hydroxyethyl)-4-{(Z)-[(2E)-2-(3-methyl-1,3-benzothiazol-2(3H)-ylidene)hydrazono]methyl}pyridinium bromide (4) | bright orange; strongly fluorescent under UV excitation |
| 13 | 3-(2-hydroxyethyl)-1-methyl-2-{(Z)-[(2E)-2-(3-methyl-1,3-benzothiazol-2-(3H)-ylidene)hydrazono]methyl}-1H-imidazol-3-ium bromide (5) | lemon-yellow |
| 14 | 4-[(E)-({bis[4-(dimethylamino)phenyl]methylene}hydrazono)methyl]-1-methylpyridinium methylsulfate (6) | dark wine-red |
| 15 | 3-[(E)-({bis[4-(dimethylamino)phenyl]methylene}hydrazono)methyl]-1-methylpyridinium methylsulfate (7) | orange |
| 16 | 2-{(E)-[(2Z)-2-(3,4-dimethyl-1,3-thiazol-2(3H)-ylidene)-hydrazono]methyl}-3-(methyl)-1-methyl-1H-imidazol-3-ium methylsulfate (8) | brilliant yellow; shows strong green-yellow fluorescence under UV excitation |
| 17 | 2-{(E)-[(2Z)-2-(3,4-dimethyl-1,3-thiazol-2(3H)-ylidene)-hydrazono]methyl}-3-(methyl)-1-methyl-1H-imidazol-3-ium methylsulfate | appreciably brightened natural hair |

Examples 18+19

Colorant for Simultaneous Brightening and Dyeing (with Oxidant)

Brightening Powder Base P:

| | |
|---|---|
| 20.0 g | of potassium persulfate |
| 30.0 g | of ammonium persulfate |
| 24.0 g | of sodium silicate |
| 12.5 g | of magnesium oxide |
| 5.0 g | of hydroxyethylcellulose |
| 6.0 g | of soap pellets |
| 2.0 g | of disperse silicic acid |
| 0.5 g | of disodium EDTA |

Ready-to-use Colorant

| | |
|---|---|
| 0.1 g | of dye of general formulas (I) and (II) |
| 5.0 g | of brightening powder base P |
| 10.0 g | of hydrogen peroxide (12% in water) |

The foregoing components were mixed to form a homogeneous mass so that the dye particles could no longer be seen. An amount of the afore-said colorant sufficient for hair dyeing was then applied to the hair. After a treatment time of 45 min at 40° C., the hair was rinsed with lukewarm water, treated with an acidic conditioner, again rinsed and then dried.

The coloring results are shown in the following Table 2.

TABLE 2

| Example No. | Dye as per Example (...) | Coloring Result |
|---|---|---|
| 18 | 1-(2-hydroxyethyl)-4-{(Z)-[(2E)-2-(3-methyl-1,3-benzothiazol-2(3H)-ylidene)hydrazono]methyl}pyridinium bromide (4) | gold-orange |
| 19 | 3-(2-hydroxyethyl)-1-methyl-2-{(Z)-[(2E)-2-(3-methyl-1,3-benzothiazol-2-(3H)-ylidene)hydrazono]methyl}-1H-imidazol-3-ium bromide (5) | lemon-yellow, shows yellow-green fluorescence when excited under UV |

Examples 20-25

Oxidation Hair Colorant

The following dye carrier composition in cream form was prepared:

| | |
|---|---|
| 23.0 g | of cetyl alcohol |
| 10.0 g | of lauryl alcohol diethylene glycol ether sulfate sodium salt (28% aqueous solution) |
| 0.3 g | of ascorbic acid |
| 0.4 g | of sodium sulfite |
| 0.4 g | of isopropyl alcohol |
| X g | of dye of formula (I)/(II) as per Table 3 |
| Y g | of developer(s) as per Table 3 |
| Z g | of couplers as per Table 3 |
| to 100.0 g | water, demineralized |

The following dyes of general formulas (I) and (II) and developers and couplers were used (see Table 3).

Before use, 20 g of the afore-said dye carrier composition was mixed with 20 g of a 6% hydrogen peroxide emulsion. The resulting ready-to-use oxidation hair colorant was applied to the hair and after a treatment time of 30 min at 40° C. the hair was rinsed with water and then treated with an acidic conditioner and dried.

The dyes used and the result of the coloring treatment are shown in the following Table 3.

TABLE 3

Dyes used

| Example No. | a) Dyes of formula (I)/(II)<br>b) Developers<br>c) Couplers | Coloring Result |
|---|---|---|
| 20 | a) —<br>b) 0.055 g of 1,4-diamino-2-methylbenzene sulfate<br>c) 0.014 g of 1,3-dihydroxybenzene; 0.015 g of 1,3-dihydroxy-2-methylbenzene | beige-brown |
| 21 | a) 0.1 g of 1-(2-hydroxyethyl)-4-{(Z)-[(2E)-2-(3-methyl-1,3-benzothiazol-2(3H)-ylidene)hydrazono]methyl}pyridinium bromide (4)<br>b) 0.055 g of 1,4-diamino-2-methylbenzene sulfate<br>c) 0.014 g of 1,3-dihydroxybenzene; 0.015 g of 1.3-dihydroxy-2-methylbenzene | medium blond |
| 22 | a) 0.1 g of 3-(2-hydroxyethyl)-1-methyl-2-{(Z)-[(2E)-2-(3-methyl-1,3-benzothiazol-2(3H)-ylidene)hydrazono]methyl}-1H-imidazol-3-ium bromide (5)<br>b) 0.055 g of 1,4-diamino-2-methylbenzene sulfate<br>c) 0.014 g of 1,3-dihydroxybenzene; 0.015 g of 1,3-dihydroxy-2-methylbenzene | gold-brown |
| 23 | a) —<br>b) 0.028 g of 1,4-diamino-2-methylbenzene sulfate; 0.015 g of 4-amino-3-methylphenol<br>c) 0.010 g of 1.3-dihydroxybenzene; 0.010 g of 1,3-dihydroxy-2-methylbenzene; 0.010 g of 3-aminophenol | weak gray-brown |
| 24 | a) 0.1 g of 1-(2-hydroxyethyl)-4-{(Z)-[(2E)-2-(3-methyl-1,3-benzothiazol-2(3H)-ylidene)hydrazono]methyl}pyridinium bromide (4)<br>b) 0.028 g of 1,4-diamino-2-methylbenzene sulfate; 0.015 g of 4-amino-3-methylphenol<br>c) 0.010 g of 1,3-dihydroxybenzene; 0.010 g of 1,3-dihydroxy-2-methylbenzene; 0.010 g of 3-aminophenol | brown-silvery |
| 25 | a) 0.1 g 3-(2-hydroxyethyl)-1-methyl-2-{(Z)-[(2E)-2-(3-methyl-1,3-benzothiazol-2(3H)-ylidene)hydrazono]methyl}-1H-imidazol-3-ium bromide (5)<br>b) 0.028 g of 1,4-diamino-2-methylbenzene sulfate; 0.015 g of 4-amino-3-methylphenol<br>c) 0.010 g of 1,3-dihydroxybenzene; 0.010 g of 1,3-dihydroxy-2-methylbenzene; 0.010 g of 3-aminophenol | gray-silvery, lustrous |

Unless otherwise indicated, all percentages are by weight.

The invention claimed is:

1. A cationic heteroarylazine dye selected from the group consisting of: 1-(2-hydroxyethyl)-3-{(Z)-[(2E)-2-(3-methyl-1,3-benzothiazol-2(3H)-ylidene)hydrazono]methyl}pyridinium bromide, 4-{(E)-[(2Z))-2-(3,4-dimethyl-1,3-thiazol-2(3H)-ylidene)hydrazono]methyl}-1-(2-hydroxyethyl)pyridinium bromide, 2-{(E)-[(2Z)-2-(3,4-dimethyl-1,3-thiazol-2(3H)-ylidene)hydrazono]methyl-3-(methyl)-1-methyl-1H-imidazol-3-ium methylsulfate, 3-(2-hydroxyethyl)-1-methyl-2-{(Z)-[(2E)-2-(3-methyl-1,3-benzothiazol-2(3H)-ylidene)hydrazono]methyl}-1H-imidazol-3-ium bromide, 1-(2-hydroxyethyl)-4-{(Z)-[(2E)-2-(3-methyl-1,3-benzothiazol-2(3H)-ylidene)hydrazono]methyl}pyridinium bromide, 4-[(E)-({bis[4-(dimethylamino)phenyl]methylene}hydrazono)methyl]-1-(2-hydroxyethyl)pyridinium bromide, 4-[(E)-({bis[4-dimethylamino)phenyl]methylene}hydrazono)methyl]-1-(2-hydroxyethyl)quinolinium bromide, 4-[(E)-({bis[4-(dimethylamino)phenyl]-methylene}hydrazono)methyl]-1-methylpyridinium methylsulfate, 4-[(E)-({bis[4-(diethylamino)phenyl]methylene}hydrazono)methyl]-1-methylpyridinium methylsulfate, 4-[(E)-(9H)-fluoren-9-ylidenehydrazono)methyl]-1-methylpyridinium methylsulfate, 3-[(E)-({bis[4-(dimethylamino)phenyl]methylene}hydrazono)methyl]-1-methylpyridinium methyl-sulfate, 4-{(E)-[(2Z)-2-(3,4-dimethyl-1,3-thiazol-2(3H)-ylidene)hydrazono]methyl}-1-methylpyridinium methylsulfate and 4-[(E)-({bis[4-(dimethylamino)phenyl]methylidene}hydrazono)methyl]-1-methylquinolinium methylsulfate.

2. An agent for non-oxidative dyeing of keratin fibers, wherein the agent contains a cationic heteroarylazine dye as defined in claim 1.

3. An agent for non-oxidative dyeing of keratin fibers, comprising:

(a) a cationic heteroarylazine dye of general formulas (I) and (II)

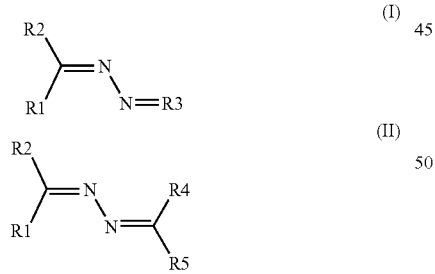

(I)

(II)

wherein
R1 stands for a group of formula (III), (IV), (V) or (VI);

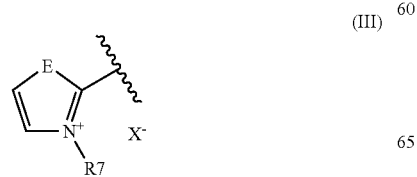

(III)

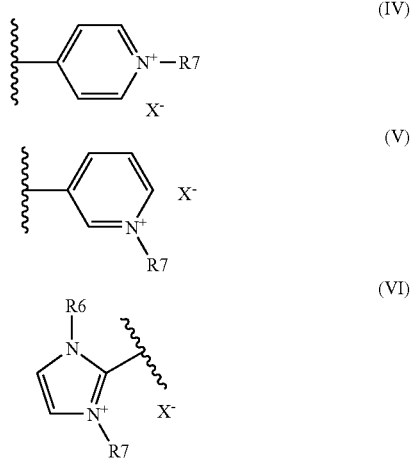

(IV)

(V)

(VI)

E stands for an oxygen atom or a sulfur atom;
R2, R4 and R5 can be equal or different and stand for hydrogen, a tertiary butyl group, an isopropyl group, a $C_1$-$C_6$-alkyl group, a $C_1$-$C_6$-hydroxyalkyl group or a group of general formula (VII);

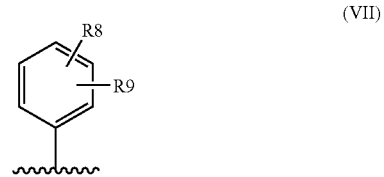

(VII)

R3 stands for a group of formula (VIII), (IX) or (X)

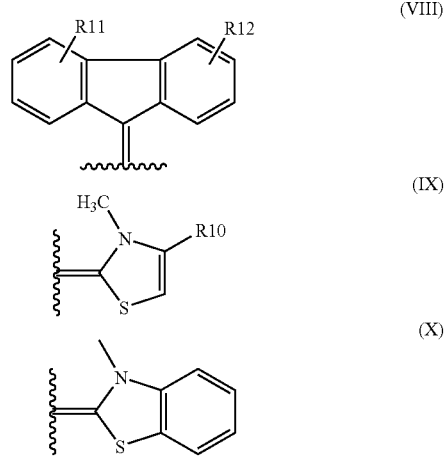

(VIII)

(IX)

(X)

R6 stands for hydrogen, a straight-chain or branched $C_1$-$C_6$-alkyl group or a straight-chain or branched $C_2$-$C_4$-hydroxyalkyl group;
R7 stands for a branched or linear $C_1$-$C_6$-alkyl group, a $C_2$-$C_4$-hydroxyalkyl group or a $C_4$-$C_8$-polyhydroxyalkyl group;
R8 and R9 can be equal or different and stand for hydrogen, a $C_{1-6}$-alkylamino group, a $C_1$-$C_6$-N,N-dialkylamino group, a $C_1$-$C_6$-N,N-dihydroxyalkylamino group, a $C_1$-$C_6$-N-hydroxyalkyl-N-alkylamino group, a $C_1$-$C_6$-alkylcyano group, a methoxymethyl group, a tertiary butyl group, an isopropyl group, a $C_1$-$C_6$-alkyl group, a $C_1$-$C_6$-alkyloxy group or a $C_1$-$C_6$-hydroxyalkyl group;

R10 stands for hydrogen, a straight-chain or branched $C_1$-$C_6$-alkyl group or a straight-chain or branched $C_2$-$C_4$-hydroxyalkyl group;

R11 and R12 can be equal or different and stand for hydrogen, a $C_1$-$C_6$-alkylamino group, a $C_1$-$C_6$-N,N-dialkylamino group, a $C_1$-$C_6$-N,N-dihydroxyalkylamino group, a $C_1$-$C_6$-N-hydroxyalkyl-N-alkylamino group, a $C_1$-$C_6$-alkylcyano group, a methoxymethyl group, a tertiary butyl group, an isopropyl group, a $C_1$-$C_6$-alkyl group, a $C_1$-$C_6$-alkyloxy group or a $C_1$-$C_6$-hydroxyalkyl group; and X⁻ stands for an anion and (b) at least one natural polymer, synthetic polymer or modified polymer of natural origin commonly used in cosmetic agents and wherein the agent is in the form of a tinting setting agent or color setting agent.

4. An agent for the simultaneous brightening and dyeing of keratin fibers, wherein the agent contains (a) an oxidant and (b) at least one cationic heteroarylazine dye of general formulas (I) and (II)

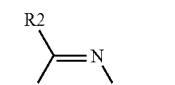
(I)

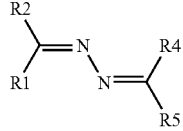
(II)

wherein

R1 stands for a group of formula (III), (IV), (V) or (VI);

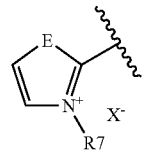
(III)

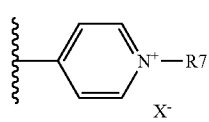
(IV)

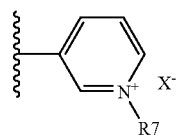
(V)

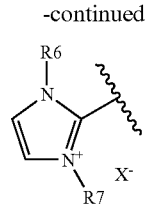
(VI)

E stands for an oxygen atom or a sulfur atom;

R2, R4 and R5 can be equal or different and stand for hydrogen, a tertiary butyl group, an isopropyl group, a $C_1$-$C_6$-alkyl group, a $C_1$-$C_6$-hydroxyalkyl group or a group of general formula (VII);

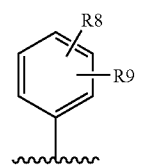
(VII)

R3 stands for a group of formula (VIII), (IX) or (X)

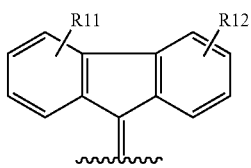
(VIII)

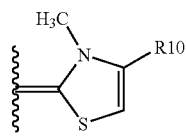
(IX)

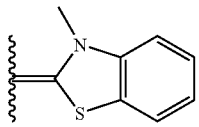
(X)

R6 stands for hydrogen, a straight-chain or branched $C_1$-$C_6$-alkyl group or a straight-chain or branched $C_2$-$C_4$-hydroxyalkyl group;

R7 stands for a branched or linear $C_1$-$C_6$-alkyl group, a $C_2$-$C_4$-hydroxyalkyl group or a $C_4$-$C_6$-polyhydroxyalkyl group;

R8 and R9 can be equal or different and stand for hydrogen, a $C_1$-$C_6$-alkylamino group, a $C_1$-$C_6$-N,N-dialkylamino group, a $C_1$-$C_6$-N,N-dihydroxyalkylamino group, a $C_1$-$C_6$-N-hydroxyalkyl-N-alkylamino group, a $C_1$-$C_6$-alkylcyano group, a methoxymethyl group, a tertiary butyl group, an isopropyl group, a $C_1$-$C_6$-alkyl group, a $C_1$-$C_6$-alkyloxy group or a $C_1$-$C_6$-hydroxyalkyl group;

R10 stands for hydrogen, a straight-chain or branched $C_1$-$C_6$-alkyl group or a straight-chain or branched $C_2$-$C_4$-hydroxyalkyl group;

R11 and R12 can be equal or different and stand for hydrogen, a $C_1$-$C_6$-alkylamino group, a $C_1$-$C_6$-N,N-dialkylamino group, a $C_1$-$C_6$-N,N-dihydroxyalkylamino group, a $C_1$-$C_6$-N-hydroxyalkyl-N-alkylamino group a $C_1$-$C_6$-alkylcyano group, a methoxymethyl group, a tertiary butyl group, an isopropyl group, a $C_1$-$C_6$-alkyl group a $C_1$-$C_6$-alkyloxy group or a $C_1$-$C_6$-hydroxyalkyl group; and $X^-$ stands for an anion.

5. An agent as defined in claim 4, wherein the oxidant is selected from the group consisting of hydrogen peroxide, persulfates, perborates and mixtures of these compounds.

6. An agent for the oxidative dyeing of keratin fibers based on oxidation dye precursors, wherein the agent contains at least one cationic heteroarylazine dye of general formulas (I) and (II)

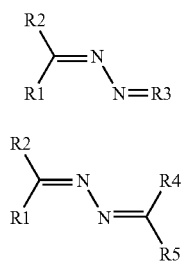
(I)

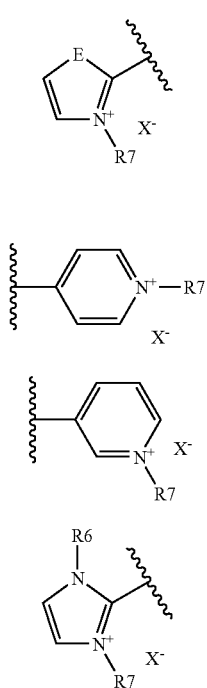
(II)

wherein

R1 stands for a group of formula (III), (IV), (V) or (VI);

(III)

(IV)

(V)

(VI)

E stands for an oxygen atom or a sulfur atom;

R2, R4 and R5 can be equal or different and stand for hydrogen, a tertiary butyl group, an isopropyl group, a $C_1$-$C_6$-alkyl group, a $C_1$-$C_6$-hydroxyalkyl group or a group of general formula (VII);

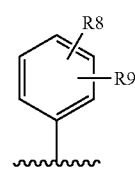
(VII)

R3 stands for a group of formula (VIII), (IX) or (X)

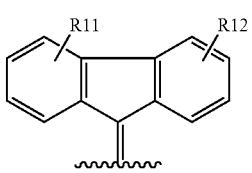
(VIII)

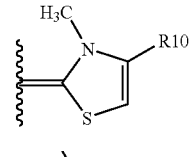
(IX)

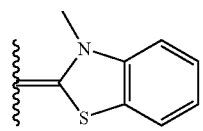
(X)

R6 stands for hydrogen, a straight-chain or branched $C_1$-$C_6$-alkyl group or a straight-chain or branched $C_2$-$C_4$-hydroxyalkyl group;

R7 stands for a branched or linear $C_1$-$C_6$-alkyl group, a $C_2$-$C_4$-hydroxyalkyl group or a $C_4$-$C_6$-polyhydroxyalkyl group;

R8 and R9 can be equal or different and stand for hydrogen, a $C_1$-$C_6$-alkylamino group, a $C_1$-$C_6$-N,N-dialkylamino group, a $C_1$-$C_6$-N,N-dihydroxyalkylamino group, a $C_1$-$C_6$-N-hydroxyalkyl-N-alkylamino group, a $C_1$-$C_6$-alkylcyano group, a methoxymethyl group, a tertiary butyl group, an isopropyl group, a $C_1$-$C_6$-alkyl group, a $C_1$-$C_6$-alkyloxy group or a $C_1$-$C_6$-hydroxyalkyl group;

R10 stands for hydrogen, a straight-chain or branched $C_1$-$C_6$-alkyl group or a straight-chain or branched $C_2$-$C_4$-hydroxyalkyl group;

R11 and R12 can be equal or different and stand for hydrogen, a $C_1$-$C_6$-alkylamino group, a $C_1$-$C_6$-N,N-dialkylamino group, a $C_1$-$C_6$-N,N-dihydroxyalkylamino group, a $C_1$-$C_6$-N-hydroxyalkyl-N-alkylamino group, a $C_1$-$C_6$-alkylcyano group, a methoxymethyl group, a tertiary butyl group, an isopropyl group, a $C_1$-$C_6$-alkyl group, a $C_1$-$C_6$-alkyloxy group or a $C_1$-$C_6$-hydroxyalkyl group; and $X^-$ stands for an anion.

7. An agent as defined in claim 6, wherein the agent contains from 0.01 to 12 weight percent of at least one oxidation dye precursor.

8. An agent as defined in claim 2, wherein the agent contains the cationic heteroarylazine dye in a total amount from 0.01 to 10 weight percent.

9. An agent as defined in claim 2, wherein the agent is a hair colorant.

10. An agent as defined in claim 3, wherein the cationic heteroarylazine dye of general formulas (I) and (II) is selected from the group consisting of:

1-(2-hydroxyethyl)-3-{(Z)-[(2E)-2-(3-methyl-1,3-benzothiazol-2(3H)-ylidene)hydrazono]methyl}pyridinium bromide, 4-{(E)-[(2Z))-2-(3,4-dimethyl-1,3-thiazol-2(3H)-ylidene)hydrazono]methyl}-1-(2-hydroxyethyl)pyridinium bromide, 2-{(E)-[(2Z)-2-(3,4-dimethyl-1,3-thiazol-2(3H)-ylidene)hydrazono]methyl-3-(methyl)-1-methyl-1H-imidazol-3-ium methylsulfate, 3-(2-hydroxyethyl)-1-methyl-2-{(Z)-[(2E)-2-(3-methyl-1,3-benzothiazol-2(3H)-ylidene)hydrazono]methyl}-1H-imidazol-3-ium bromide, 1-(2-hydroxyethyl)-4-{(Z)-[(2E)-2-(3-methyl-1,3-benzothiazol-2(3H)-ylidene)hydrazono]methyl}pyridinium bromide, 4-[(E)-({bis[4-(dimethylamino)phenyl]methylene}hydrazono)methyl]-1-(2-hydroxyethyl)pyridinium bromide, 4-[(E)-({bis[4-dimethylamino)phenyl]methylene}hydrazono)methyl]-1-(2-hydroxyethyl)quinolinium bromide, 4-[(E)-({bis[4-(dimethylamino)phenyl]-methylene}hydrazono)methyl]-1-methylpyridinium methylsulfate, 4-[(E)-({bis[4-(diethylamino)phenyl]methylene}hydrazono)methyl]-1-methylpyridinium methylsulfate, 4-[(E)-(9H)-fluoren-9-ylidenehydrazono)methyl]-1-methylpyridinium methylsulfate, 3-[(E)-({bis[4-(dimethylamino)phenyl]methylene}hydrazono)methyl]-1-methylpyridinium methylsulfate, 4-{(E)-[(2Z)-2-(3,4-dimethyl-1,3-thiazol-2(3H)-ylidene)hydrazono]methyl}-1-methylpyridinium methylsulfate and 4-[(E)-({bis[4-(dimethylamino)phenyl]methylidene}hydrazono)methyl]-1-methylquinolinium methylsulfate.

* * * * *